Feb. 12, 1952    J. D. RUSSELL    2,585,350
PRESSURE MEASURING DEVICE
Filed June 24, 1947    2 SHEETS—SHEET 1
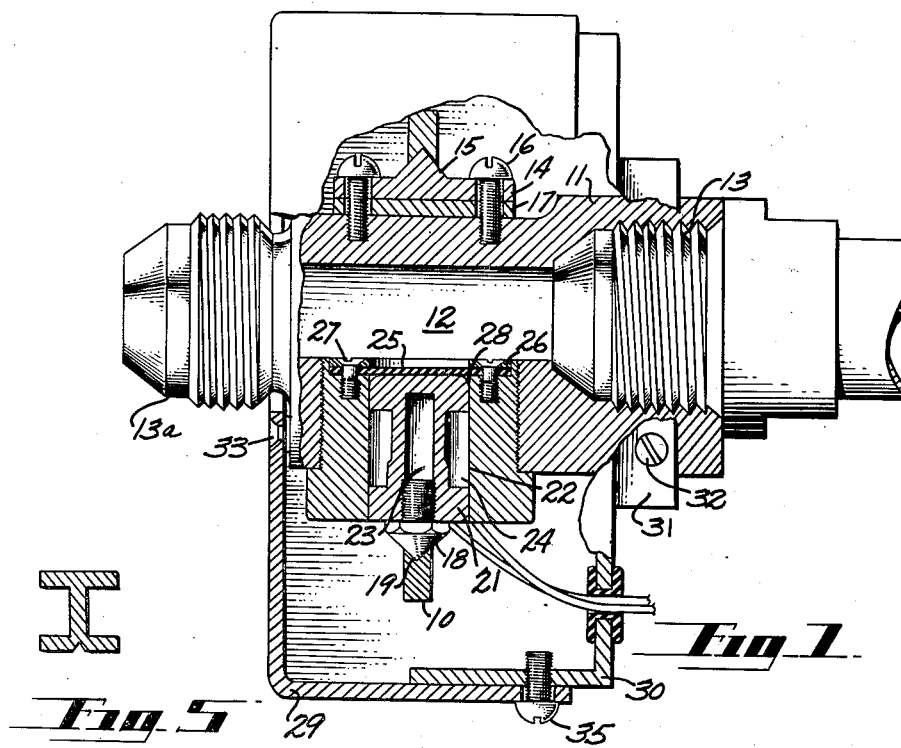
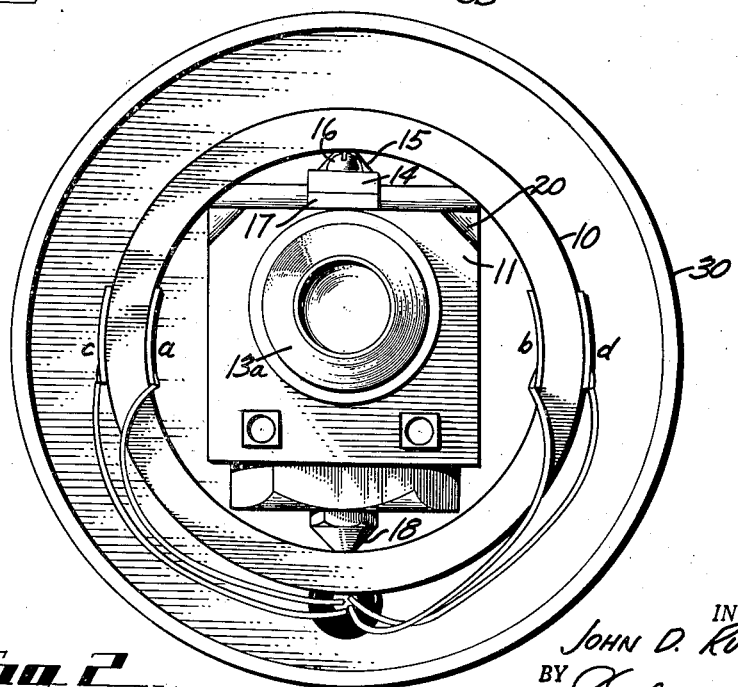
INVENTOR.
JOHN D. RUSSELL
BY Edwin Coates
ATTORNEY Feb. 12, 1952 — J. D. RUSSELL — 2,585,350
PRESSURE MEASURING DEVICE
Filed June 24, 1947 — 2 SHEETS—SHEET 2

INVENTOR.
JOHN D. RUSSELL
BY Edwin Coates
ATTORNEY

Patented Feb. 12, 1952

2,585,350

UNITED STATES PATENT OFFICE 2,585,350

PRESSURE MEASURING DEVICE

John D. Russell, Hollywood, Calif., assignor to Douglas Aircraft Company, Inc., Santa Monica, Calif.

Application June 24, 1947, Serial No. 756,689

18 Claims. (Cl. 73—419)

This invention relates to measuring devices and more particularly to such a device for accurately measuring physical changes in a test object.

The device of the present invention, in the broadest aspects thereof, comprises a deformable means together with means for deforming the same in response to physical changes in a test object. The physical changes of the test object are imposed on the deformable means and the deformation of that means is translated through deformation sensing and measuring means into some unit of measure of physical change.

The deformable means may comprise an annular member of some flexible material while the deformation sensing means may comprise electrical resistance type strain gauges bonded to said annular member and connected through suitable balancing circuits to instruments which measure the change in resistance of the gauges in terms of physical change of the test object.

Although the within invention may have many other applications it has been found extremely useful in one embodiment as a pressure gauge for measuring the pressure of fluids, gases or other substances contained within such confining structures as conduits, vessels or the like. Various instruments for making such measurements have been made or proposed but have in certain respects been deficient. One such method of measuring pressure was to mount a small chamber having an electrical strain sensitive filament bonded to the same at a point on the confining structure, where a pressure recording was desired. The small chamber was so mounted as to be in communication with the interior of the confining structure and therefore was subject to the same pressure as that of the confining structure. Another method of obtaining a pressure recording was to bind strain gauges directly to the conducting body or pipe or to a thin walled tubing which could be temporarily bridged in or mounted upon the conducting body. The chief disadvantage common to all of the aforesaid methods of measurement, is the possibility of error due to the high temperature sensitivity of such methods. On the other hand, the within invention has an extremely low and inconsequential temperature sensitivity and in addition thereto possesses a high pressure sensitivity and high resonance frequency over a wide range of pressures.

Since the recording means associated with the pressure gauge are electrical, measurement may be taken at any time and permanent records taken which may thereafter be studied for necessary corrective measures.

Other features and advantages of the said invention will be apparent from the following description taken in connection with the accompanying drawings in which:

Figure 1 is a side elevation view of a pressure gauge embodying the present invention partly cut away so as to illustrate the interior of the gauge;

Figure 2 is a front view of the pressure gauge with one member of the casing removed;

Figure 5 is a cross section view of an alternate style of ring for use in the pressure gauge.

Figure 3:
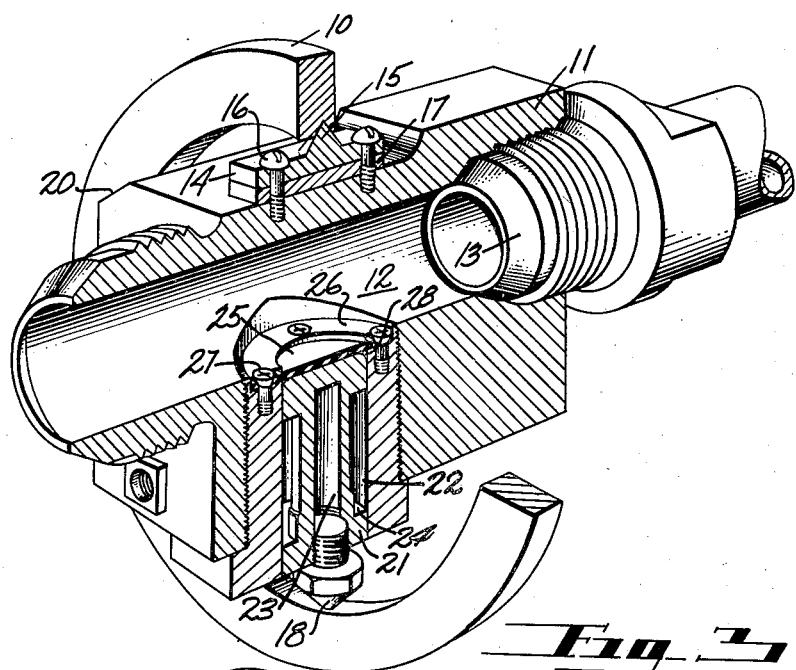
Figure 3 is a fragmentary perspective view of the pressure gauge, partly in section, with the casing removed.

One embodiment of the present invention shown by Figures 1 and 2 is particularly adapted for measuring the pressure of fluids in a containing structure. This embodiment comprises a thin annular member or ring 10 circumscribing a manifold 11 having a passage 12 therethrough and formed with suitable fittings 13 and 13a at each end thereof. So designed, the pressure gauge may be bridged or interposed in a hydraulic line. However, if preferred, either of said fittings may be closed by a cap or plug so that the gauge may be mounted to a T attachment in the hydraulic line.

A plate 14 formed with a conical member 15 is attached to one wall of the manifold 11 by screws 16, the conical member 15 being adapted to engage the inner periphery of the ring 10. A shim 17 may be placed between the plate 14 and the wall of the manifold 11 to aid in the adjustment of the conical member 15 relative to the inner periphery of the ring 10.

A second conical member 18 engages the inner periphery of the ring 10 at a point diametrically opposite to the portion of the periphery engaged by the member 15. To prevent accidental separation of the ring from the manifold small indentations 19 are formed in the ring 10 to receive the apices of the conical members and thus hold the ring in position circumscribing the manifold 11.

In mounting the ring 10, it is first engaged with conical member 18, being afterwards adjusted with conical member 15 by using a shim 17 as aforesaid. Because the radius of said ring is small in order to obtain high resonant frequency, and since it is not practicable to correspondingly reduce the size of the manifold and members contained therein which are immediately hereafter referred to, the upper edges of the manifold 11 are beveled as at points 20, extending from the forward part of the manifold to a position somewhat beyond the ring as seen readily in Figures 2 and 3, to permit the ring 10 to be lowered sufficiently for easy engagement with conical member 18.

The conical member 18 is threadedly mounted in a piston 21 operating in a cylinder 22 which in turn is threadedly mounted in the manifold 11. It will be observed that the piston 21 is formed with a longitudinally extending blind bore 23 and is also reduced at 24 intermediate the ends thereof to maintain the weight and consequently the inertia of the piston to a minimum. This results in increased resonant frequency, reduction of friction and heat conductivity and at the same time provides a reservoir for light lubricating oil.

Since the fluid under pressure might contain foreign substances likely to damage the piston and cylinder walls, the inner end of the cylinder 22 is sealed by a flexible diaphragm 25, preferably formed of some resilient material impervious to the fluids, the pressure of which is to be measured by the instrument. As any foreign particles held by the fluid cannot enter between the piston and the cylinder wall all danger of the piston sticking or binding in the cylinder is eliminated. The diaphragm is held to the inner end of the cylinder 22 by a ring 26 and screws 27, the screws being countersunk in the ring 26 so as to present no obstacle to the fluid flow through the passageway 12 of the manifold 11.

It will be observed upon further examination of Figure 1 that the inner edges of both the piston 21 and cylinder 22 are formed with small bevels 28 to reduce the wear on the diaphragm 25 as well as to obviate the possibility of the edges cutting said diaphragm. Use of the diaphragm also assures that the readings will be consistently accurate since leakage, resulting in reduction of pressure exerted, is impossible between the piston and cylinder wall.

A protective case, consisting of a pair of substantially cup-shaped members 29 and 30 respectively, completely encloses the ring and manifold. The one wall of the member 30 has an opening of such shape and size with a continuous flange 31 extending outwardly therefrom as to permit it to slide over the manifold, the flange being formed with apertures for receiving screws 32 to fix the member 30 to the body of the manifold. The apertures are preferably countersunk and flat head screws are used to present a flat surface after the screws have been tightened for receiving a wrench or other tool for threading the instrument onto a line.

The opposite end of the protective covering 29 likewise has an opening of sufficient size and shape to permit the male fitting 13a to extend therethrough. This member of the casing is held to the manifold by a plurality of screws 33 threaded into tapped openings formed in spaced bosses carried by the one face of the manifold as best shown in Figure 2.

The diameter of the member 29 is sufficiently larger than that of the member 30 to permit the former to telescopically receive the latter, the two halves of the casing being held against relative movement by the screws 35 passed through openings formed about the cylindrical wall of the member 29 and threaded into tapped openings extending through the cylindrical wall of the casing member 30.

In the operation of the pressure gauge above described, whether bridged in a line or mounted by means of a T attachment, the liquid under pressure will be forced against the diaphragm 25 which in turn will force the piston 21 outwardly to urge the member 18 against the ring 10 to deform the same.

Thus if means are provided for sensing the deformation of the ring 10 and for measuring the same in units of pressure, the strain induced in the ring can be read as a measurement of the pressure inducing the strain. Although a number of means can be employed, it is now preferred to use a plurality of electrical resistance wire type strain gauges as the means for sensing the deformation of the ring. In the illustrated embodiment of the instrument of the present invention shown in Figures 1 through 3, the strain gauges $a$, $b$, $c$, and $d$ each comprise a filament of current conducting wire, the resistance of which will vary in accordance with changes of strain therein, formed into an elongate grid bonded to a body member of insulating material which, in turn, is bonded to the inner and outer peripheral faces of the ring 10 as best seen in Figure 2.

The strain gauges may be bonded to any desired area of the inner and outer peripheral faces of the ring, although it is now preferred to circumferentially bond the gauges to the inner and outer faces of the ring at diametrically opposite points on the same intermediate the points of contact between the ring and the conical members 15 and 18.

As should be understood, the deformation of the ring is transmitted to the filaments of the strain gauges which varies the resistance of the grid. The strain readings can readily be translated by means of a conventional balancing bridge circuit and current-measuring instruments commonly used today in similar adaptations of such circuits.

As the strain gauges are not in direct contact with the structure confining the fluid, the pressure of which is being measured, variations in the temperature of the fluid have little if any effect on the grids of the strain gauges. Such heat as may be transmitted must be transmitted through the piston 21 and thence through the small medium of transmission presented by the conical member 18 engaging the ring 10. Any heat so transmitted then must travel about the ring to the points where the strain gauges are adhesively bonded. Furthermore as the gauges are symmetrically located relative to the point of contact between the piston and ring any heat changes in the fluid should equally effect all gauges and consequently any changes in the resistance of the gauges $a$ and $b$ brought about by changes in the temperature of the same should in effect be cancelled by the opposite changes produced in the gauges $c$ and $d$.

As resonant frequency of a ring varies inversely as the square of the radius and directly as the depth or thickness, high resonant frequency can be obtained by forming the ring with as small a radius and as great a depth as practicable. On the other hand, it has been found that the pressure sensitivity of the gauge herein shown varies directly as the radius of the ring but inversely as the square of the depth or thickness. Although the width of the ring is an immaterial factor in determining resonant frequency, the pressure sensitivity of the ring is found to vary inversely as the width of the same. Thus the ring should be as narrow as practical, the width of the strain gauge being the limiting factor, because by forming the ring narrow a desirable increase in pressure sensitivity is produced with a reduction in resonant frequency.

It will also be seen that a ring of small radius will have a high resonant frequency but a lower pressure sensitivity than a ring of a larger radius. On the other hand, however, the pressure sensitivity can be increased by decreasing both the depth and width of the ring. Although the resonant frequency will be lower in a shallow ring, the loss of resonant frequency is not as great as the gain in pressure sensitivity so that a compromise can be reached which will produce a ring having both high resonant frequency and high pressure sensitivity. Thus an ideal compromise would consist of a ring having its width and radius as small as practicable and its thickness adjusted to provide the maximum permissible pressure sensitivity.

The resonant frequency can be further increased by forming the ring of a material having a low modulus of rigidity while at the same time increasing the ring thickness to keep the pressure sensitivity constant. In such a ring for a given pressure the stresses would be the same as for a ring of a more rigid material, but with the increased thickness the resonant frequency would be higher.

There is shown in Figure 5 a modified form of the deformable ring 10 in which the opposite faces of the ring 42 have been formed with annular grooves 43. It will be seen from the cross sectional showing of Figure 5 that the grooves in effect reduce the average width of the ring to produce a ring of high resonant frequency as well as high pressure sensitivity. The flanges 44 reinforce the reduced section of the ring and at the same time provide suitable surfaces to which the strain gauges can be bonded.

Figure 3 illustrates a typical bridge circuit commonly used today as a part of measuring instruments employing resistance type strain gauges. The strain gauges *a, b, c,* and *d* are connected into a bridge as shown by their terminal conductive wires. Gauges mounted on the inner surface of the ring are indicated at *a* and *b* in the bridge while the gauges mounted on the outer surface of the ring are indicated at *c* and *d*.

When the resistance of *a* and *b* increase by the expanding force exerted by the piston in response to an increase in pressure of the fluid undergoing test the resistance of *c* and *d* will decrease. As should be understood this renders the bridge extremely sensitive and permits accurate readings of even relatively small pressure changes.

An amplifier of any suitable type may be connected across the bridge while an oscillograph or equivalent instrument may be used to enable the observer to see or record pressure changes. For slowly changing pressure variations in the fluid or for calibration of the pressure gauge a galvanometer may be substituted for the amplifier and oscillograph.

An alternate embodiment of the pressure gauge above described is illustrated in Figurge 4. Although the earlier described embodiment is capable of measuring pressure in a large hydraulic system when mounted by means of a T attachment, it is sometimes desirable that the pressure gauge be interposed in the system thereby giving a through-pick-up pressure reading. Since the radius of the ring necessarily must be small to secure a high resonant frequency gauge, it is obvious that the ring could not circumscribe a large manifold.

Figure 4:
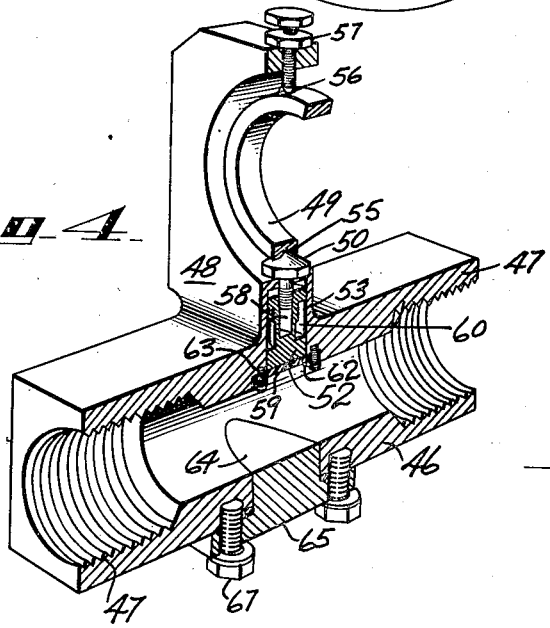
Figure 4 is a perspective view of an alternate embodiment of pressure gauge, partly in section so as to more fully illustrate the interior of the gauge.
Figure 6:
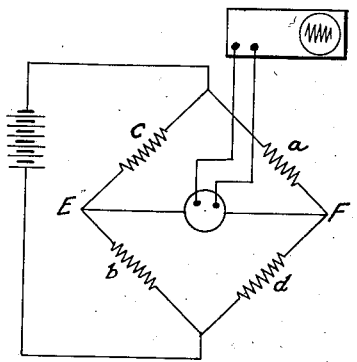
Figure 6 is a schematic wiring diagram of a suitable balancing circuit showing the strain gauges and an indicating instrument connected thereinto.

In the alternate embodiment shown in Figure 4, therefore, the respective members of the earlier described embodiment are rearranged so that deformation of the ring is accomplished by force applied inwardly instead of outwardly against the ring. To this end, the present embodiment of the alternate form of the gauge comprises a manifold 46 having a passageway extending therethrough formed with fittings 47 at each end thereof. A casing 48 rigidly attached to said manifold and projecting therefrom carries the deformable member or ring 49. A conical member 50, threadedly engaged in a piston 52 operating in a cylinder 53 extending from the inner wall of the passageway intermediate the ends thereof into said casing of said manifold, engages in an indentation 55 formed in the outer periphery of the ring. A second conical member 56 similarly engages the ring at a point diametrically opposite the conical member 50, being threadedly carried by the wall of said casing thereby permitting adjustment of the ring 49, which adjustment is maintained by use of a lock nut 57 mounted on the threaded portion of the member 56.

As in the earlier described embodiment, the piston 52 has a hollow center 58 and is cut away at the sides 60 to reduce the mass of the same which results in increased resonant frequency reduction of friction and heat conductivity and at the same time provides a reservoir for light lubricating oil. To guard against foreign substances in the fluid under pressure causing damage to the piston and cylinder wall, the inner end of the cylinder 53 is sealed by a flexible diaphragm 59 preferably formed of a flexible material impervious to the fluids to be tested, being held to the inner end of the cylinder by a ring 62 and screws 63 in like manner and for like reasons as in the earlier described embodiment. The inner edges of both the piston and cylinder wall are preferably beveled to reduce wear and the possibility of rupture of the diaphragm 59.

To bore the cylinder 53 an opening 64 is formed in the diametrically opposite wall of the manifold which opening permits the assembly of the piston and diaphragm. The opening further permits access to the interior of the manifold when it is necessary to replace the diaphragm. The opening is closed at all other times by a flanged plug 65 the flange of the plug having openings to pass means for securing the plug to the manifold 46 such as the screws 67. Cover members, not shown, may be mounted to opposite faces of the casing 48 to protect the ring and the conical members associated therewith.

As in the earlier described embodiment of the gauge, strain gauges, not shown, are adhesively bonded to the ring 49 at diametrically opposite positions. The strain gauges would be connected into a balancing circuit such as described in connection with the earlier described form of the gauge.

The operation of the alternate embodiment of the pressure gauge is similar to the earlier described embodiment. The liquid under pressure is forced against the diaphragm 59 which in turn forces the piston 52 inwardly against the ring 49 to deform the same. The deformation is transmitted to the filaments of the said strain gauges, the resistance variations thereof being readily translated into terms of fluid pressure. The same low temperature sensitivity exists in this embodiment as in the earlier described embodiment, since little if any heat will be transmitted to the strain gauges from the fluid undergoing measurement.

Although the now preferred embodiment of the invention has been shown and described herein, it is to be understood that the invention is not to be limited thereto, for the invention is susceptible to changes in form and detail within the scope of the appended claims.

I claim:

1. A pressure measuring instrument, comprising: a chamber adapted to communicate with a structure confining a fluid under pressure; an elastically deformable annulus fixed, at a point on its inner periphery, to said chamber; a piston operating in a bore formed in a wall of said chamber and having an end thereof engaging said annulus at a point diametrically opposed to the first said point, said piston being subject to the pressure of said fluid and movable in response to changes thereof to deform said annulus; deformation sensing means disposed on the periphery of said annulus; and means connected to said sensing means for translating said sensings into units measuring the changes in the pressure of said fluid.

2. A pressure measuring instrument, comprising: a chamber adapted to communicate with a structure confining a fluid under pressure; an elastically deformable annulus circumscribing said chambers; a piston operating in a bore formed in a wall of said chamber and having an end thereof engaging said annulus; means carried by said chamber engaging said annulus at a point diametrically opposite the engagement of piston and annulus for holding the latter against bodily movement; said pitson being subject to the pressure of said fluid and movable in response to changes thereof to deform said annulus; deformation sensing means disposed on the periphery of said annulus; and means connected to said sensing means for translating said sensings into units measuring the changes in the pressure of said fluid.

3. In a fluid-pressure gauge: a manifold having at least two opposed faces and adapted to be inserted in a fluid-line and including a longitudinally extending passageway and a bore extending transversely of the manifold into intersection with said passageway; a cylinder fixedly mounted coaxially of said bore; a piston reciprocably mounted in said cylinder; a resilient annulus transversely circumscribing said manifold and radially spaced therefrom; an outwardly extending pointed member carried by the outer end of said piston and extending outwardly from one of said opposed faces of said manifold and engaging the inner periphery of said annulus; and a pointed member extending outwardly from the opposite face of said manifold and engaging the inner periphery of the annulus at a point lying diametrically opposite the first-said point thereof.

4. A fluid-pressure gauge, comprising the combination of: a manifold having at least two opposed faces and adapted to be connected into a structure confining a fluid under pressure and including a longitudinally extending passageway and a bore extending transversely of the manifold into intersection with said passageway; a cylinder fixedly mounted coaxially of said bore; a piston reciprocably mounted in said cylinder; a resilient annulus of relatively small radius transversely circumscribing said manifold and radially spaced therefrom; an outwardly extending pointed member carried by the outer end of said piston and extending outwardly from one of said opposed faces of said manifold and engaging the inner periphery of said annulus at a predetermined point thereof; a pointed member extending outwardly from the opposite face of said manifold and engaging the inner periphery of the annulus at a point lying diametrically opposite the first-said point thereof; and deformation-sensing and measuring means operatively so organized respectively with said annulus and with each other as to translate the deformations of said annulus by reason of movement of said piston in response to changes in the pressure of said fluid into units measuring pressure fluctuations.

5. In a fluid pressure gauge: a manifold having at least two opposed faces and adapted to be connected into a structure confining a fluid under pressure and including a longitudinal passageway rectangularly intersected by a transversely extending bore; a cylinder fixedly mounted coaxially of said bore and defining, at its intersection with said passage, a radially directed port; a sheet of resilient material impervious to said fluid sealingly mounted transversely of said port, whereby to exclude fluids and foreign substances carried by said fluids from said bore while transmitting fluid pressure thereto; a piston reciprocably mounted in said cylinder; a resilient annulus transversely circumscribing said manifold and radially spaced therefrom; an outwardly extending pointed member carried by the outer end of said piston and extending outwardly from one of said opposed faces of said manifold and engaging the inner periphery of said annulus at a predetermined point thereof; and a pointed member extending outwardly from the opposite face of the manifold and engaging the inner periphery of the annulus at a point lying diametrically opposite the first said point thereof.

6. In a fluid pressure gauge, the sub-combination of: a manifold having an upper face bounded lengthwise thereof by upper, adjacent edges and adapted to be inserted in a fluid line, and constituted by a block having a height fixed at an irreducible minimum and having its upper adjacent edges downwardly bevelled, said block including a longitudinal pressure-fluid passageway rectangularly intersected by a transversely extending bore; an outwardly extending pointed member fixedly mounted on the upper face of the manifold; an outwardly pressure-movable member mounted in said bore and exposed at one end to said pressure and having the other end terminating pointedly outwardly diametrically opposite to said fixed point; and a resilient annulus having a high resonant frequency-conferring radius insufficiently large to enable it to encircle an unbevelled block of said irreducible height, said annulus transversely circumscribing said block in contact with said movable point and adapted to be brought into contact with said fixed point upon outward movement of said movable point, by virtue of the block clearance provided by said bevels.

7. A fluid pressure gauge, comprising the comprising the combination of: a manifold having an upper face bounded lengthwise thereof by upper, adjacent edges and adapted to be inserted in a fluid line and constituted by a block having a height fixed at an irreducible minimum and having its upper adjacent edges downwardly bevelled, said block including a longitudinal pressure-fluid passageway rectangularly intersected by a transversely extending bore; an outwardly extending pointed member fixedly mounted on the upper face of the manifold; an outwardly pressure-movable member mounted in said bore and exposed at the one end to said pressure and having the other end terminating pointedly outwardly diametrically opposite to said fixed point; a resilient annulus having a high resonant frequency conferring radius insufficienlty large to enable it to encircle an unbevelled block of said irreducible height, said annulus transversely circumscribing said block by virtue of the block clearance provided by said bevels, and held against bodily movement relative to said block by said pointed members, said annulus being deformed by movement of said pressure-movable member in response to changes in pressure of said fluid; and deformation-sensing and measuring means operatively so organized respectively with said annulus and with each other as to translate said deformations into units measuring pressure fluctuations.

8. A fluid-pressure gauge, comprising: the combination of: a manifold having an upper face bounded lengthwise thereof by upper, adjacent edges and adapted to be inserted in a fluid line and including a longitudinally extending passageway and a bore extending transversely of the manifold into intersection with said passageway; a cylinder fixedly mounted coaxially of said bore; a generally cylindrical block reciprocably mounted in said cylinder and peripherally reduced intermediate its ends and having an axially extending blindbore, thereby constituting the block a piston of low inertia, subject to pressure of the fluid in said line; a resilient annulus of relatively small radius transversely circumscribing said manifold and radially spaced therefrom; an outwardly extending pointed member carried by the outer end of said piston and engaging the inner periphery of said annulus at a predetermined point thereof; a pointed member extending outwardly from the opposite face of said manifold and engaging the inner periphery of the annulus at a point lying diametrically opposite the first said point thereof; and deformation-sensing and measuring means operatively so organized respectively with said annulus and with each other as to translate the deformations said annulus produced by movement of said piston into units measuring pressure fluctuations.

9. A fluid pressure gauge of high resonant frequency for measuring the pressure in relatively large hydraulic systems, comprising the combination of: a manifold adapted to be inserted in a relatively large-diameter fluid line and including a longitudinal passageway; a flange extending rectangularly outwardly from one face thereof and including a central aperture and a smaller bore extending radially therefrom and through the body of the flange into intersection with said passageway; a piston reciprocably mounted in said bore and exposed at the one end to said pressure, the opposite end terminating in a pointed member extending into said aperture; a relatively small-radius, resilient annulus having a high resonant frequency, mounted coaxially of said aperture and supported at one point of its periphery on said pointed member and supported at a diametrically opposite point on its periphery from the adjacent wall of said aperture; and deformation sensing and measuring means operatively so organized respectively with said annulus and with each other as to translate the deformations of said annulus produced by movement of said piston into units measuring said pressure fluctuations.

10. A gauge of the type described, comprising: means forming a chamber; means for communicating the interior of said chamber with the interior of a structure confining a fluid under pressure; a piston operating in a cylinder formed in a wall of said chamber and leading thereinto, said piston movable in response to changes in the pressure of the fluid confined by said structure; pliant means for sealing said bore at the inner end thereof; an elastically deformable annulus; means adjustably carried by said chamber-forming means engaged with said annulus and rigidly holding the same against bodily movement in one direction; means carried by the one end of said piston and engaged with said annulus at a point diametrically opposite the engagement between said annulus and said last named means whereby said annulus is mounted between the said means and thereby deformable by movement of said piston in response to changes in the pressure of said fluid; deformation sensing means carried by said annulus; and means connected to said sensing means for translating said sensings into units measuring the changes in the pressure of said fluid.

11. A measuring gauge of the type described, comprising: a pair of aligned, oppositely directed acuate members; an elastically deformable annulus mounted between and supported at diametrically spaced points by said acuate members; means forming a chamber having opposed faces; means for communicating the interior of said chamber with the interior of a structure confining a fluid under pressure; a piston operating in a cylinder formed in a wall of said chamber and movable in response to changes in the pressure of the fluid confined by said structure, one of said acuate members being carried by the outer end of said piston and movable therewith in response to changes in the pressure of said fluid to induce strain in said annulus, the other of said acuate members being fixedly mounted relatively to a wall of said chamber opposed to the first-said wall and resisting bodily movement of said annulus upon movement of said piston; and deformation sensing means mounted on said annulus for responding to the strain thereof as an index of the magnitude of the pressure change producing movement of said piston.

12. A gauge of the type described, comprising: means forming a chamber; means for communicating the interior of said chamber with the interior of a structure confining a fluid under pressure; a piston operating in a cylinder formed in a wall of said chamber and movable in response to changes in the pressure of the fluid confined by said structure; an elastically deformable annulus; means carried by said chamber-forming means engaging said annulus and rigidly holding the same against bodily movement in one direction; means carried by the one end of said piston and engaged with said annulus at a point diametrically opposite the engagement between said annulus and said last named means whereby said annulus is mounted between the said means and thereby deformable by movement of said piston in response to changes in the pressure of said fluid; deformation sensing means carried by said annulus; and means connected to said sensing means for translating said sensings into units measuring the changes in the pressure of said fluid.

13. A measuring gauge of the type described, comprising: a pair of aligned, oppositely directed acuate members; an elastically deformable annulus mounted between and supported by said acuate members; means forming a chamber; means for communicating the interior of said chamber with the interior of a structure confining a fluid under pressure; a piston operating in a cylinder formed in a wall of said chamber and movable in response to changes in the pressure of the fluid confined by said structure, one of said acuate members being carried by said piston and movable therewith in response to changes in the pressure of said fluid to induce strain in said annulus; and deformation sensing means mounted on said annulus for responding to the strain thereof as an index of the magnitude of the pressure change producing movement of said piston.

14. A fluid pressure gauge of the type described, comprising: means forming a chamber; means for communicating the interior of said chamber with the interior of a structure confining a fluid under pressure; a piston operating in a cylinder formed in a wall of said chamber and movable in response to changes in the pressure of the fluid confined by said structure; an elastically deformable annulus; means carried by said chamber-forming means provided with a conical extremity engaging said annulus and rigidly holding the same against bodily movement in one direction; means carried by the one end of said piston provided with a conical extremity engaged with said annulus at a point diametrically opposite the engagement between said annulus and said first conical extremity whereby said annulus is mounted between and supported by said extremities and thereby deformable by movement of said piston in response to changes in the pressure of said fluid; deformation sensing means carried by said annulus; and means communicated to said sensing means for translating said sensings into units measuring the changes in the pressure of said fluid.

15. A measuring gauge of the type described, comprising: a pair of aligned, oppositely directed acuate members; an elastically deformable annulus mounted between and supported at diametrically opposite points by said acuate members; means forming a chamber; means for communicating the interior of said chamber with the interior of a structure confining a fluid under pressure; means carried by said chamber-forming means for rigidly supporting one of said acuate members; a piston operating in a cylinder formed in a wall of said chamber and movable in response to changes in the pressure of the fluid confined by said structure, the other of said acuate members being carried by said piston and moveable therewith in response to changes in the pressure of said fluid to induce strain in said annulus; and deformation sensing means mounted on said annulus for responding to the strain thereof as an index of the magnitude of the pressure change.

16. A gauge of the type described, comprising: a casing having a centrally located circular aperture therein; an acuate member mounted to said casing and projecting radially into said aperture; an elastically deformable annulus concentrically disposed within said aperture and engaged by said acuate member; a second acuate member radially projecting into said aperture and engaging said annulus at a point diametrically opposite the point of engagement of said first acuate member; means forming a chamber, said means fixed to said casing and having a cylinder formed therein opening into said aperture, the longitudinal axis of said cylinder coinciding with the diametric axis of said opening; means for communicating the interior of said chamber with the interior of a structure confining a fluid under pressure; a piston reciprocably mounted in said cylinder and movable in response to changes in the pressure of the fluid confined by said structure; means for securing said second acuate member to the one end of said piston whereby movement of said piston induces a strain in said annulus; and a plurality of deformation sensing means mounted on said annulus for responding to the strain thereof as an index of the magnitude of the pressure change producing movement of said piston.

17. A gauge of the type described, comprising: means forming a chamber; means for communicating the interior of said chamber with the interior of a structure confining a fluid under pressure; a piston operating in a cylinder formed in a wall of said chamber and movable in response to changes in the pressure of the fluid confined by said structure; a casing normally projecting from one side of said chamber-forming means provided with a centrally located, circular aperture therein, said cylinder opening into said aperture and having its longitudinal axis coincident with a diametric axis of said aperture; an elastically deformable annulus concentrically disposed within said opening; means, carried by said casing and intersected by said diametric axis, engaging said annulus and rigidly holding the same against bodily movement in one direction; means carried by the one end of said piston and engaged with said annulus at a point diametrically opposite the engagement between said annulus and said last named means whereby said annulus is mounted between the said means and thereby deformable by movement of said piston in response to changes in the pressure of said fluid; deformation sensing means carried by said annulus; and means connected to said sensing means for translating said sensings into units measuring the changes in the pressure of said fluid.

18. A gauge of the type described, comprising: a casing having a centrally located circular opening therein; means having a chamber therein supporting said casing; said chamber-forming means having a cylinder leading from said chamber to said opening, the longitudinal axis of said cylinder coinciding with a diametric axis of said opening; an acuate member mounted to said casing with its longitudinal axis coincident with said diametric axis and projecting radially into said opening; an elastically deformable annulus concentrically disposed within said opening and engaged by said acuate member; a second acuate member aligned with said first member and radially projecting into said opening and engaging said annulus at a point diametrically opposite the point of engagement of said first acuate member; means communicating said chamber with the interior of a structure confining a fluid under pressure; a piston reciprocably mounted in said cylinder and movable in response to changes in the pressure of the fluid confined by said structure; means for securing said second acuate member to the one end of said piston whereby movement of said piston induces a strain in said annulus; and a plurality of deformation sensing means mounted on said annulus for responding to the strain thereof as an index of the magnitude of the pressure change producing movement of said piston.

JOHN D. RUSSELL.

REFERENCES CITED

The following references are of record in the file of this patent:

UNITED STATES PATENTS

| Number | Name | Date |
|---|---|---|
| 1,395,653 | Nernst | Nov. 1, 1921 |
| 1,828,093 | Ailman | Oct. 20, 1931 |
| 2,173,493 | Peters | Sept. 19, 1939 |
| 2,420,148 | Ostergren | May 6, 1947 |
| 2,421,222 | Schaevitz | May 27, 1947 |

OTHER REFERENCES

Theis (article: Aircraft Engineering) April 1943. pgs. 106–109.